(12) United States Patent
Rocha et al.

(10) Patent No.: US 10,326,394 B2
(45) Date of Patent: Jun. 18, 2019

(54) WOUND FIELD GENERATOR OVERVOLTAGE PREVENTION

(71) Applicant: Hamilton Sundstrand Corporation, Charlotte, NC (US)

(72) Inventors: Diego A. Rocha, Rockford, IL (US); Dhaval Patel, Loves Park, IL (US); Jonathan C. Dell, Elgin, IL (US); John F. Defenbaugh, Rockford, IL (US); Eric A. Brust, Rockton, IL (US); Andreas C. Koenig, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/792,475

(22) Filed: Oct. 24, 2017

(65) Prior Publication Data
US 2019/0123669 A1 Apr. 25, 2019

(51) Int. Cl.
| | | |
|---|---|---|
| H02P 9/00 | (2006.01) |
| H02P 9/44 | (2006.01) |
| H02P 9/48 | (2006.01) |
| F02N 11/08 | (2006.01) |
| H02P 9/08 | (2006.01) |
| H02P 101/30 | (2015.01) |

(52) U.S. Cl.
CPC ............ *H02P 9/44* (2013.01); *F02N 11/0866* (2013.01); *H02P 9/08* (2013.01); *H02P 9/48* (2013.01); *H02P 2101/30* (2015.01)

(58) Field of Classification Search
CPC ...... H02P 9/44; H02P 9/08; H02P 9/48; H02P 2101/30; F02N 11/0866
USPC .................................. 322/46, 59, 89, 20, 24
See application file for complete search history.

(56) References Cited

U.S. PATENT DOCUMENTS

| | | | | |
|---|---|---|---|---|
| 4,625,160 A | * | 11/1986 | Hucker | H02K 3/16 310/115 |
| 4,772,802 A | * | 9/1988 | Glennon | F02N 11/04 290/31 |
| 5,493,200 A | * | 2/1996 | Rozman | H02P 9/08 322/10 |

(Continued)

OTHER PUBLICATIONS

Extended European Search Report dated Mar. 14, 2019, received for corresponding European Application No. 18202306.9, 13 pages.

(Continued)

*Primary Examiner* — Julio C. Gonzalez
(74) *Attorney, Agent, or Firm* — Kinney & Lange, P.A.

(57) ABSTRACT

An aircraft main power generation system includes a rotor shaft, a main power generator a permanent magnet, an exciter, an aircraft power bus, and a generator control unit. The generator control unit is configured to provide a control current to the exciter in response to a speed of the main power generator reaching a threshold speed and electrically couple the main power generator to the aircraft power bus in response to the speed of the main power generator reaching a minimum operating speed, the threshold speed being lower than the minimum operating speed; or provide a control current to the exciter in response to the speed of the main power generator reaching a predetermined speed and electrically coupling the main power generator to the aircraft power bus in response to a time period elapsing after the speed of the main power generator has reached the predetermined speed.

10 Claims, 3 Drawing Sheets

(56) References Cited

U.S. PATENT DOCUMENTS

| | | | |
|---|---|---|---|
| 6,894,402 B2 | 5/2005 | Dubus et al. | |
| 7,821,145 B2 | 10/2010 | Huang et al. | |
| 8,148,834 B2 | 4/2012 | Huang et al. | |
| 2004/0080300 A1* | 4/2004 | Xu | F02C 7/268 322/59 |
| 2004/0113592 A1* | 6/2004 | Adams | H02H 7/065 322/27 |
| 2004/0150232 A1 | 8/2004 | Xu et al. | |
| 2007/0222220 A1* | 9/2007 | Huang | F02N 11/04 290/31 |
| 2009/0009129 A1* | 1/2009 | Markunas | H02P 9/10 318/702 |
| 2012/0182648 A1* | 7/2012 | Maddali | H02H 7/065 361/21 |
| 2017/0170763 A1 | 6/2017 | Blackwelder et al. | |

OTHER PUBLICATIONS

IEEE Guide for Aircraft Electric Systems,, Mar. 22, 1976, The Institute of Electrical and Electronics Engineers, Inc., USA.

* cited by examiner

WOUND FIELD GENERATOR OVERVOLTAGE PREVENTION

BACKGROUND

Commonly aircraft based power generation systems use a three-stage main generation system. The stages include a permanent magnet generator (PMG) that provides power to a generator control unit. The generator control unit supplies control current to an exciter. The exciter transfers or generates 3-phase power on the rotor of the generator which is rectified by a 3-phase diode rectifier and fed to the rotating field winding of the main machine. The field winding of the main machine rotates, generating power that is fed to the aircraft loads. By adjusting the control current fed to the exciter, the main field winding current can be controlled to maintain a fixed output voltage on the main machine. Generation systems are designed to saturate magnetically such that a maximum voltage cannot be exceeded even if the maximum possible control current is supplied to the exciter due to a system failure mode when operating at normal operating temperatures. However, if the maximum possible control current is supplied to the exciter when operating at very low temperatures, the output voltage of the main generator can exceed the capability of the power system to withstand without damage.

SUMMARY

In one example, an aircraft main power generation system comprises a rotor shaft, a main power generator a permanent magnet, an exciter, an aircraft power bus, and a generator control unit. The main power generator includes generator windings. The generator windings are mechanically coupled to the rotor shaft such that the rotor shaft causes the generator windings to spin when the rotor shaft is spinning. The permanent magnet generator is mechanically coupled to the rotor shaft. The permanent magnet generator is configured to generate power when the rotor shaft is spinning. The exciter is electrically coupled to the generator windings of the main power generator. The exciter is configured to provide a current to the generator windings in response to receiving a control current. The aircraft power bus is configured to receive power from the main power generator when electrically coupled to the main power generator. The generator control unit is electrically coupled to the permanent magnet generator and configured to receive power generated by the permanent magnet generator. The generator control unit is configured to monitor a speed of the main power generator. The generator control unit is further configured to provide a control current to the exciter in response to the speed of the main power generator reaching a threshold speed and electrically couple the main power generator to the aircraft power bus in response to the speed of the main power generator reaching a minimum operating speed, the threshold speed being lower than the minimum operating speed; or provide a control current to the exciter in response to the speed of the main power generator reaching a predetermined speed and electrically coupling the main power generator to the aircraft power bus in response to a time period elapsing after the speed of the main power generator has reached the predetermined speed.

In one example, a method for starting a main power generation system of an aircraft comprises receiving power from a permanent magnet generator; monitoring a speed of a main power generator in response to receiving power; providing a control current to an exciter in response to the speed of the main power generator reaching a threshold speed and coupling, electrically, the output power of the main power generator in response to the speed of the main power generator reaching a minimum operating speed, the threshold speed being lower than the minimum operating speed; or the speed of the main power generator reaching a predetermined speed and electrically coupling the main power generator to the aircraft power bus in response to a time period elapsing after the speed has reached the predetermined speed.

DETAILED DESCRIPTION

Apparatus, systems, and associated methods relate to aircraft main power generation systems. During low temperature startups, the resistance of the field winding of a main power generator can be low enough to allow an overvoltage condition, which can damage aircraft electrical power systems. A generator control unit that causes the field winding to heat up before connecting the main power generator power output to the aircraft power bus can prevent overvoltage conditions. Using the apparatus, systems, and associated methods herein, allows for startup of an aircraft main power generation system in low temperature conditions without causing an overvoltage condition and damaging the aircraft electrical power system.

Figure 1:
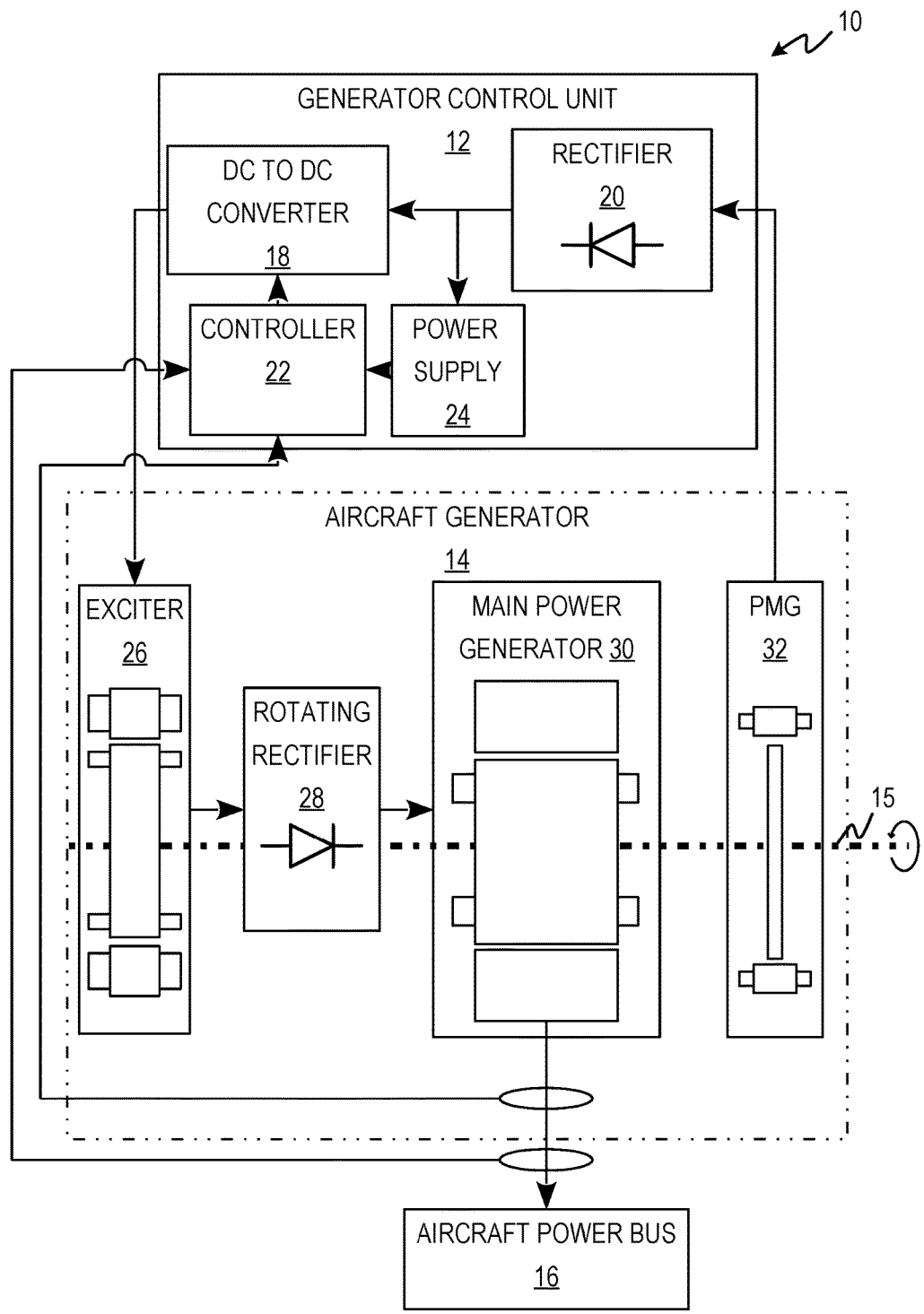
FIG. 1 is a block diagram of an aircraft main power generation system.

FIG. 1 is a block diagram of aircraft main power generation system 10 including generator control unit 12, aircraft generator 14, rotor shaft 15, and aircraft power bus 16. Generator control unit 12 includes direct current (DC) to DC converter 18, rectifier 20, controller 22, and power supply 24. Aircraft generator 14 includes exciter 26, rotating rectifier 28, main power generator 30, and permanent magnet generator 32.

Rotor shaft 15 is connected to an engine of the aircraft, which causes rotor shaft 15 to spin. Rotor shaft 15 is mechanically coupled to the rotors of exciter 26, main power generator 30, and permanent magnet generator 32 causing them to spin. Rotor shaft 15 is also mechanically coupled to rotating rectifier 28. The spinning of permanent magnet generator 32 generates an alternating current (AC) power, which is provided to rectifier 20. Rectifier 20 converts the AC power to DC which is then supplied to DC to DC converter 18 and power supply 24. Power supply 24 conditions the power for controller 22. Controller 22 controls DC to DC converter 18 to provide a control current to exciter 26. Exciter 26 provides an AC current to rotating rectifier 28. The AC current provided by exciter 26 is determined by the control current provided by generator control unit 12. Rotating rectifier 28 converts the AC current provided by exciter 26 to a DC current. Rotating rectifier 28 provides DC current to the windings of main power generator 30. The output voltage of the main power generator 30 is controlled by the DC current from exciter 26 and the speed of the windings of main power generator 30. Main power generator 30 provides power to aircraft power bus 16 when main power generator 30 is electrically coupled to aircraft power bus 16.

Controller 22 is configured to monitor the speed of main power generator 30 and electrically couple and decouple main power generator 30 from aircraft power bus 16. Controller 22 is configured to provide the control current to exciter 26 based upon the output voltages and speed of main power generator 30. The frequency of the main power generator 30 output voltage is related the rotational speed of the field windings of main power generator 30 measured in Hz. In one example, controller 22 is configured to provide the control current to exciter 26 when the speed of main power generator 30 reaches a threshold speed. The threshold speed is determined based upon the acceleration rate of the generator during startup, the size of main power generator 30, the amount of current that can be supplied to the exciter 26, and how long it would take to raise the temperature of the main power generator windings above temperatures that can cause overvoltage conditions. In one example, the threshold frequency is between 200 Hz and 350 Hz. In a further example the threshold frequency is between 240 Hz and 280 Hz. After the control current is provided, controller 22 is configured to electrically couple main power generator 30 to aircraft power bus 16 in response to the frequency of main power generator 30 reaching a minimum operating frequency. The minimum operating frequency of main power generator 30 is determined based upon the requirements of the aircraft power system. In one example, the minimum operating speed is 380 Hz. Supplying current from exciter 26 before the main power generator reaches the minimum operating speed allows the main power generator to increase in temperature during startup, thereby avoiding low temperatures that can lead to overvoltage conditions.

In another example, controller 22 is configured to provide the control current to exciter 26 in response to the frequency of main power generator 30 reaching a predetermined frequency. The predetermined frequency of main power generator 30 is determined based upon the requirements of the aircraft power system. In one example, the predetermined operating frequency is 380 Hz. In another example, the predetermined frequency is equal to the minimum operating frequency. Controller 22 is configured to electrically couple main power generator 30 to aircraft power bus 16 in response to a time period elapsing after the control current has been provided. The time period is determined based upon the size of main power generator 30. In one example, the time period is between 5 seconds and 60 seconds. In another example, the time period is between 60 seconds and 100 seconds. Delaying the electrically coupling of main power generator 30 to aircraft power bus 16 gives time for the current from exciter 26 to heat up main power generator 30 before power is supplied to aircraft power bus 16. This avoids potential overvoltage conditions in aircraft power bus 16 that could otherwise occur during low temperature startups.

Figure 2:
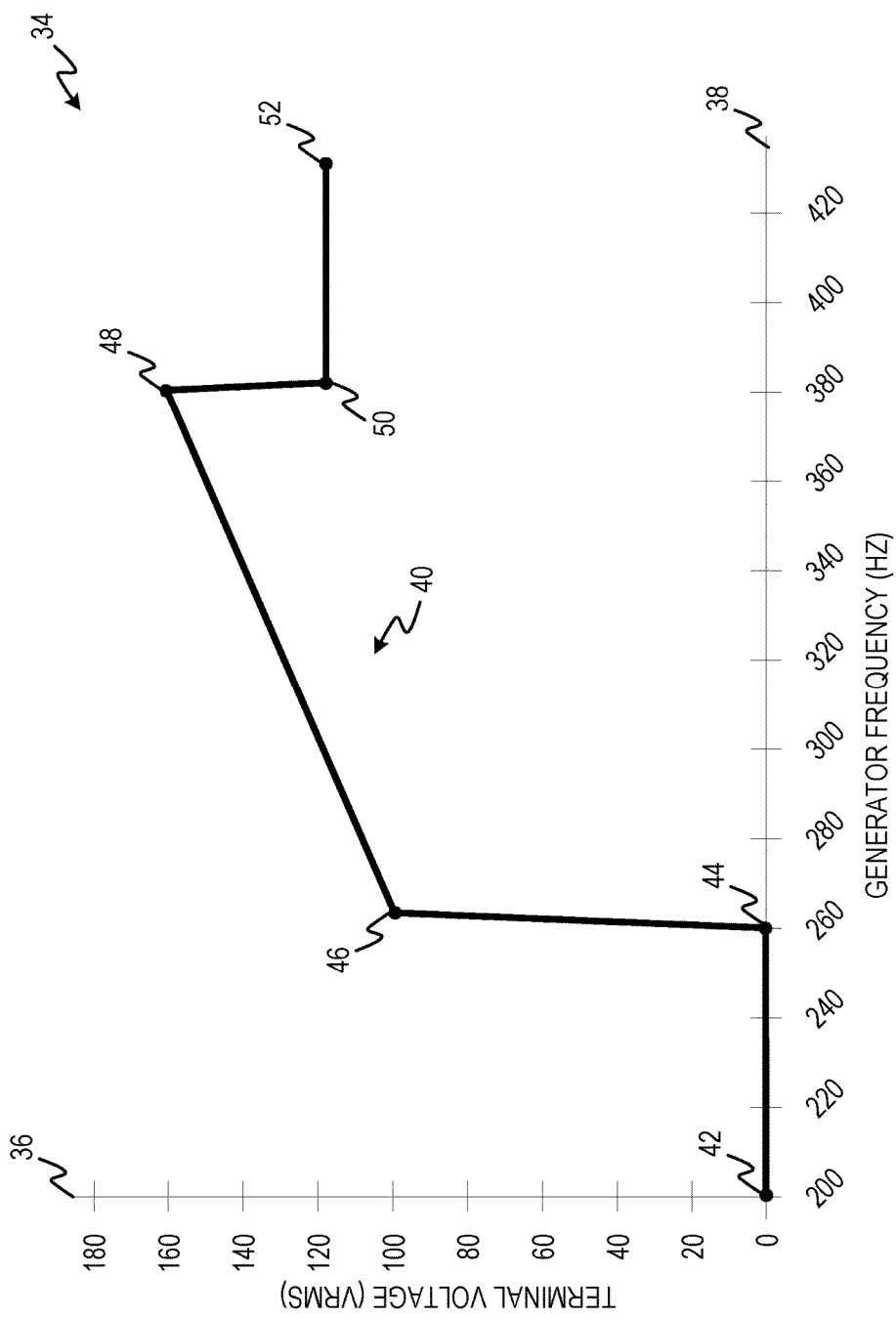
FIG. 2 is a graph illustrating the main power generator terminal voltage vs. frequency during startup of the aircraft main power generation system.

FIG. 2 is graph 34 illustrating the main power generator terminal voltage vs. frequency during startup of the aircraft main power generation system. Graph 34 includes y-axis 36, x-axis 38, and line 40. Line 40 includes points 42, 44, 46, 48, 50, and 52. For purposes of clarity and ease of discussion, the example startup is described below within the context of main power generation system 10 of FIG. 1.

Y-axis 36 depicts the terminal voltage of main power generator 30 in root mean square voltage (Vrms). X-axis 38 depicts the frequency of main power generator 30 in hertz (Hz). Line 40 depicts the terminal voltage as a function of the main power generator frequency. At point 42, main power generator 30 has started spinning up and has reached 200 Hz. From point 42 to point 44, main power generator 30 increases in speed, but is not receiving current from the exciter 26 via rotating rectifier 28. At point 44, generator control unit 12 begins providing a control current to exciter 26. In response to receiving the control current, exciter 26 provides power to main power generator 30. From point 44 to point 46, the terminal voltage increases suddenly in response to receiving current from exciter 26. At point 46, the terminal voltage increases as the frequency of the main power generator 30 increases because the terminal voltage is regulated to maintain a constant field current. From point 46 to point 48, the terminal voltage increases in proportion to the increase in the speed of main power generator 30. At point 48 occurs slightly before the minimum operating frequency of the main power generator is reached. At this point, the main power generator output voltage is regulated to the required nominal output voltage for the aircraft power system, or 115 V as shown in FIG. 2. At point 50, the minimum operating frequency of the main power generator is reached and the nominal output voltage is reached, allowing connection of the main power generator to the aircraft power bus 16. At point 50, the terminal voltage of the generator is controlled by adjusting the exciter current such that the main generator terminal voltage is constant for the range of allowable aircraft electrical system loads. After reaching point 48, if a generator control unit 12 fault allows the maximum possible exciter current to be applied within the normal operating frequency range, the generator will saturate and not exceed the maximum allowable output voltage.

Figure 3:
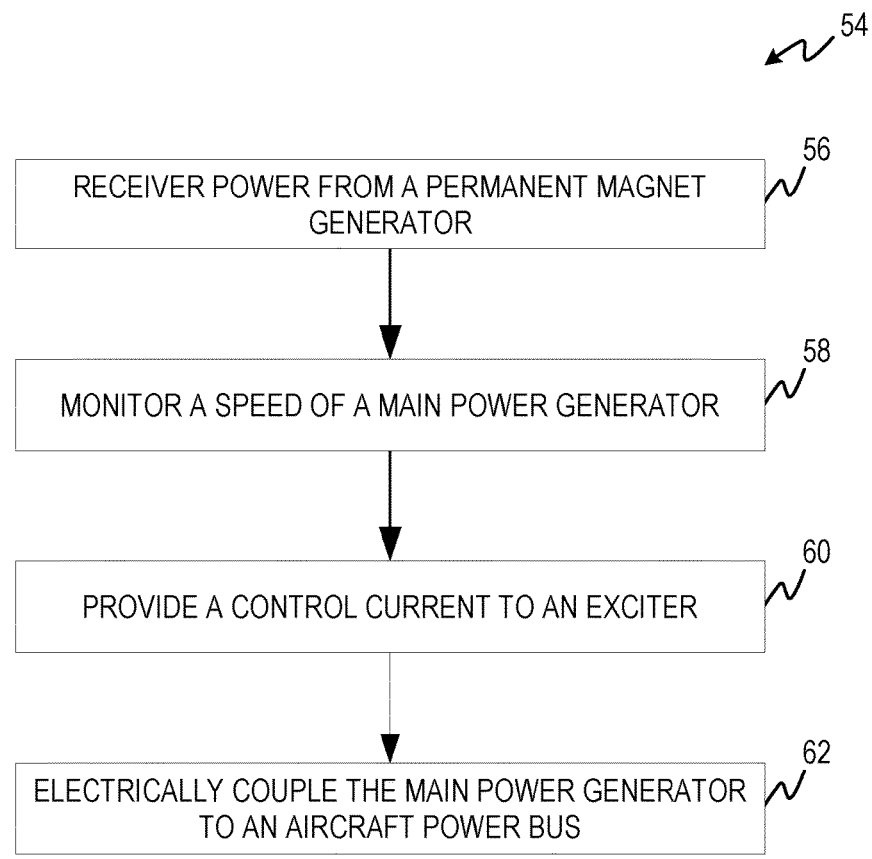
FIG. 3 is a flow diagram depicting a process for starting up an aircraft main power generation system.

FIG. 3 is flow diagram 54 depicting a process for preventing an overvoltage condition during start up an aircraft main power generation system. For purposes of clarity and ease of discussion, the example startup is described below within the context of main power generation system 10 of FIG. 1.

At step 56, power is received from permanent magnet generator 32. At step 58, a speed of main power generator 30 is monitored in response to receiving power from permanent magnet generator 32. At step 60, a control current is provided to exciter 26. The control current can be provided to exciter 26 in response to one of two optional conditions. In option one, the control current is provided to exciter 26 in response to main power generator 30 reaching a threshold frequency. The minimum threshold speed is dependent on the size of main power generator 30. In one example, the threshold frequency is between 200 Hz and 350 Hz. In option two, the control current is provided to exciter 26 in response to main power generator 30 reaching a predetermined speed. At step 62, main power generator 30 is electrically coupled to aircraft power bus 16. In option one, main power generator 30 is electrically coupled to aircraft power bus 16 in response to the frequency of main power generator 30 reaching the minimum operating frequency. In option two, main power generator 30 is inhibited from electrically coupling to aircraft power bus 16 until a time period has elapsed after the frequency of main power generator 30 reaching the predetermined frequency. In one example, the time period can be between 5 to 60 seconds. In another example, the time period can be between 60 to 100 seconds. In one example, the predetermined frequency is equal to the minimum operating frequency.

Accordingly, implementing techniques of this disclosure, generator control units configured as described herein, allow for cold startups of aircraft main power generation systems without risk of overvoltage conditions. The main power generator is not connected to the aircraft power bus until the temperature of the main power generator windings is high enough to prevent overvoltage conditions. In one example, current is provided to the main power generator windings before reaching a minimum operating speed. In another example, the main power generator is not electrically coupled to the aircraft power bus until after a time period has elapsed after the speed of the main power generator has reached a predetermined operating speed.

Discussion of Possible Embodiments

The following are non-exclusive descriptions of possible embodiments of the present invention.

An aircraft main power generation system can comprise a rotor shaft; a main power generator including generator windings, the generator windings mechanically coupled to the rotor shaft such that the rotor shaft causes the generator windings to spin when the rotor shaft is spinning; a permanent magnet generator mechanically coupled to the rotor shaft, the permanent magnet generator configured to generate power when the rotor shaft is spinning; an exciter electrically coupled to the generator windings of the main power generator, the exciter configured to provide a current to the generator windings in response to receiving a control current; an aircraft power bus configured to receive power from the main power generator when electrically coupled to the main power generator; and a generator control unit electrically coupled to the permanent magnet generator and configured to receive power generated by the permanent magnet generator, the generator control unit configured to monitor a speed of the main power generator and is configured to: provide a control current to the exciter in response to the speed of the main power generator reaching a threshold speed and electrically couple the main power generator to the aircraft power bus in response to the speed of the main power generator reaching a minimum operating speed, the threshold speed being lower than the minimum operating speed; or provide a control current to the exciter in response to the speed of the main power generator reaching a predetermined speed and electrically coupling the main power generator to the aircraft power bus in response to a time period elapsing after the speed of the main power generator has reached the predetermined speed.

The system of the preceding paragraph can optionally include, additionally and/or alternatively, any one or more of the following features, configurations and/or additional components:

The generator control unit can be configured to provide the control current to the exciter in response to the speed of the main power generator reaching the threshold speed and electrically couple the main power generator to the aircraft power bus in response to the speed of main power generator reaching the minimum operating speed.

The threshold speed is between 200 Hz and 350 Hz.

The threshold speed is between 240 Hz and 280 Hz.

The minimum operating speed is 380 Hz or greater.

The generator control unit can be configured to provide the control current to the exciter in response to the speed of the main power generator reaching the predetermined speed and electrically coupling the main power generator to the aircraft power bus in response to the time period elapsing after the speed of the main power generator has reached the predetermined speed.

The predetermined speed can be 360 Hz or greater.

The time period can be between 5 seconds and 60 seconds.

The time period can be between 60 seconds and 100 seconds.

The predetermined speed can be equal to the minimum operating speed.

A method for starting a main power generation system of an aircraft can comprise receiving power from a permanent magnet generator; monitoring a speed of a main power generator in response to receiving power; providing a control current to an exciter in response to the speed of the main power generator reaching a threshold speed and coupling, electrically, the output power of the main power generator in response to the speed of the main power generator reaching a minimum operating speed, the threshold speed being lower than the minimum operating speed; or the speed of the main power generator reaching a predetermined operating speed and electrically coupling the main power generator to the aircraft power bus in response to a time period elapsing after the speed has reached the predetermined speed.

The method of the preceding paragraph can optionally include, additionally and/or alternatively, any one or more of the following features, configurations and/or additional components:

The control current can be provided in response to the speed of the main power generator reaching the threshold speed and electrically coupling the main power generator to the aircraft power bus in response to the speed of the main power generator reaching the minimum operating speed.

The threshold speed can be between 200 Hz and 350 Hz.

The threshold speed can be between 240 Hz and 280 Hz.

The minimum operating speed can be 380 Hz or greater.

The control current can be provided in response to the speed of the main power generator reaching the predetermined speed and electrically coupling the main power generator to the aircraft power bus in response to a time period elapsing after the speed of the main power generator has reached the predetermined speed.

The predetermined speed can be 360 Hz or greater.

The time period can be between 5 seconds and 60 seconds.

The time period can be between 60 seconds or 100 seconds.

The predetermined speed can be equal to the minimum operating speed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft main power generation system comprising:
   a rotor shaft;
   a main power generator including generator windings, the generator windings mechanically coupled to the rotor shaft such that the rotor shaft causes the generator windings to spin when the rotor shaft is spinning;
   a permanent magnet generator mechanically coupled to the rotor shaft, the permanent magnet generator configured to generate power when the rotor shaft is spinning;
   an exciter electrically coupled to the generator windings of the main power generator, the exciter configured to provide a current to the generator windings in response to receiving a control current;

an aircraft power bus configured to receive power from the main power generator when electrically coupled to the main power generator; and a generator control unit electrically coupled to the permanent magnet generator and configured to receive power generated by the permanent magnet generator, the generator control unit configured to monitor a speed of the main power generator and to provide the control current to the exciter in response to the speed of the main power generator reaching a predetermined speed and electrically coupling the main power generator to the aircraft power bus in response to a time period elapsing after the speed of the main power generator has reached the predetermined speed.

2. The system of claim 1, wherein the predetermined speed is 360 Hz or greater.

3. The system of claim 1, wherein the time period is between 5 seconds and 60 seconds.

4. The system of claim 1, wherein the time period is between 60 seconds and 100 seconds.

5. The system of claim 1, wherein the predetermined speed is equal to a minimum operating speed.

6. A method for starting a main power generation system of an aircraft comprising:

receiving power from a permanent magnet generator;

monitoring a speed of a main power generator in response to receiving power;

providing a control current to an exciter in response to the speed of the main power generator reaching a predetermined speed; and electrically coupling the main power generator to an aircraft power bus in response to a time period elapsing after the speed of the main power generator has reached the predetermined speed.

7. The method of claim 6, wherein the predetermined speed is 360 Hz or greater.

8. The method of claim 6, wherein the time period is between 5 seconds and 60 seconds.

9. The method of claim 6, wherein the time period is between 60 seconds or 100 seconds.

10. The method of claim 6, wherein the predetermined speed is equal to a minimum operating speed.

* * * * *